Patented July 16, 1935

2,008,337

UNITED STATES PATENT OFFICE 2,008,337

CONDENSATION PRODUCT OF DIISOBUTY-LENE AND POLYHYDRIC PHENOLS

Jack D. Robinson, Buchanan, Mich., and William F. Hester, Drexel Hill, Pa., assignors, by mesne assignments, to Röhm & Haas Company, Philadelphia, Pa., a corporation of Delaware No Drawing. Application May 9, 1932, Serial No. 610,304

12 Claims. (Cl. 260—154)

It has been found that diisobutylene condenses readily with monohydric phenols in the presence of small amounts of acidic condensing agents, to form well defined, crystalline, nuclear alkylated phenols as described in a copending application Serial No. 600,826.

The present invention relates to condensation products of diisobutylene and polyhydric phenols and is a continuation in part of Serial No. 600,826.

By the term "polyhydric phenol" is meant any polyhydroxy aromatic compound of phenolic nature such as resorcinol, hydroquinone, pyrocatechol, dihydroxy naphthalene, 4,4'-dihydroxy diphenyl-propane-2 and the like, having a free nuclear reactive position which is available for substitution under the conditions herein described.

In practicing the preferred form of this invention a polyhydric phenol, for example resorcinol, is mixed with a molal equivalent of diisobutylene and treated preferably below 100° C. with concentrated sulphuric acid (96% strength) as a condensing agent. The reaction may be carried out with or without an inert solvent to assist stirring the mixture. In general the quantity of sulphuric acid used is very small; about 0.03 to 0.30 mole per mole of the polyhydric phenol being sufficient. Under these conditions condensation takes place smoothly to form a nuclear diisobutylated product which rapidly separates as a crystalline mass. The product obtained from resorcinol possesses the general formula

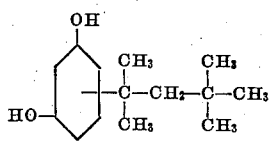

in which the exact position of the alkyl group in the aromatic nucleus is not as yet entirely certain. In a similar manner hydroquinone, pyrocatechol, etc. react to yield nuclear alkylated derivatives. These new compounds are insoluble or only very slightly soluble in hot water in contrast to the polyhydric phenols from which they are derived. They may find uses as antiseptics or germicides and as raw materials in the dyestuffs and allied chemical industries.

It is already known that monohydric and dihydric phenols may be condensed with olefines using sulphuric acid, anhydrous aluminum chloride, ferric chloride and the like but it has heretofore been necessary to use at least molal equivalents or excessive quantities of the condensing agent. At best oily or resinous mixtures of isomers, phenol ethers and other deleterious by-products are thereby produced which diminish the yield of the alkylated phenol. Alkylated polyhydric phenols from diisobutylene have moreover never heretofore been prepared. Furthermore, it could not have been predicted that such a condensation would occur in view of the fact that the only known condensation of a phenol and diisobutylene forms exclusively the corresponding phenylether. However, according to the present process good yields of the nuclear alkylated polyhydric phenols are obtained directly in pure form, in contrast to previous processes. This is accomplished by the use preferably of substantially less than a molal equivalent condensing agent, under the conditions set forth below.

Example 1

Diisobutylresorcinol—(a) Diisobutylene b. p. 101–103° C. (112 grams) and resorcinol (110 grams) were mixed together and stirred rapidly in the form of a paste while a few drops of concentrated sulphuric acid (96%) were added. This addition caused reaction to occur, the temperature rising spontaneously to about 70° C. and causing the mixture to become oily. At this point, 3 grams of additional sulphuric acid (96%) were added and the mixture stirred vigorously for about 2 hours during which time the mixture set to a solid mass. It was allowed to stand for 2 hours and was then broken up into small pieces and boiled with 1 liter of water with constant agitation to remove unchanged resorcinol and sulphuric acid. After two such treatments the water-insoluble oil which solidified on cooling, was dried and purified by recrystallization from petroleum ether. It separated in colorless needles melting at 102–103° C. Yield=130 grams, or 60% of theoretical.

(b) To a solution of 110 grams resorcinol in 50 ccm. water mixed with 112 grams diisobutylene, there was added 15 grams of 96% sulphuric acid, using vigorous agitation. The mixture was then heated at 80° C. on a water bath for 4 hours. The oily layer was removed and allowed to crystallize. After purification by washing with hot water and recrystallization from petroleum ether as described in (a) above, disobutyl resorcinol was obtained in good yield m. p. 102–103° C.

Diisobutyl-pyrocatechol.—To a mixture consisting of 110 grams pyrocatechol and 112 grams diisobutylene which is vigorously stirred, there are added four or five drops of 96% sulphuric acid. There is a decided rise in temperature which for about one half hour remains at 73° C.

During this time an additional 5 grams of 96% sulphuric is gradually added. The oily product which forms, gradually sets to a solid cake of crystals. After standing at room temperature for 1–1½ hours to complete the reaction, the mixture was melted in 1 liter of boiling water and washed therewith to remove unchanged pyrocatechol and sulphuric acid. After this treatment a crude product in the form of thick needles m. p. 103–104° C. was obtained which when recrystallized repeatedly from benzene showed a melting point of 110° C. The yield of this material was 203 grams or 91% of theoretical.

*Diisobutyl-hydroquinone.*—A mixture of 110 grams of hydroquinone and 112 grams of diisobutylene was stirred at room temperature (25° C.) while 15 grams of 96% H2SO4 was added slowly. The first few drops caused a temperature rise but the remainder had no apparent effect. The mixture was allowed to stand over night and was then heated at 80° C. on a water bath for 1 hour before pouring into water. The oil was boiled with 1 liter of water to dissolve any unchanged hydroquinone and steam distilled to remove diisobutylene. The residue left after this treatment was an oil which crystallized rapidly. This material after recrystallization from gasoline showed a melting point of 128° C. It is insoluble in 10% sodium hydroxide solution.

By the term diisobutyl as employed herein in referring to the alkyl group introduced into the aromatic nucleus, we mean the alpha, alpha, gamma, gamma tetramethylbutyl group, namely,

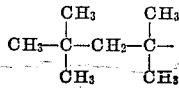

and not two isobutyl groups.

In the preceding examples concentrated sulphuric acid has been given as the preferred catalyst for carrying out the condensation. It is possible, however, to use other condensing agents of acidic character such as phosphorus oxychloride, anhydrous zinc chloride, ferric chloride hydrochloric acid, organic sulfonic acids, phosphoric acid, phosphorus pentoxide and sulfuryl chloride, for effecting the above described reaction. However, the yields and purity of the products thus obtained are considerably inferior to those obtained by the use of sulphuric acid. It is not, however, our intention to limit this process thereby; and it is therefore understood that the term "acidic catalyst" refers to any or all of the above compounds. It is, moreover, understood that inert solvents such as water, ethylene dichloride, trichlorethylene, and carbon tetrachloride may be used to assist in obtaining a more homogeneous reaction medium for the above condensations.

These examples are merely illustrative and are in no wise to be confined to the specific temperature, conditions of operation, proportion of materials etc. since it is apparent to one versed in the art that variations are possible without departing from the spirit of this invention the scope of which is determined only by the claims which follow.

What we claim is:

1. A nuclear condensation product of diisobutylene and resorcinol.

2. A condensation product of diisobutylene and resorcinol which when pure is a crystalline substance melting at about 103° C.

3. A nuclear condensation product of diisobutylene and pyrocatechol.

4. A condensation product of diisobutylene and pyrocatechol, which when pure is a crystalline substance melting at about 110° C.

5. A nuclear condensation product of diisobutylene and hydroquinone.

6. A condensation product of diisobutylene and hydroquinone, which is a crystalline substance melting at about 128° C.

7. A process which consists in treating a polyhydric phenol having a free nuclear position available for condensation, with a molecular equivalent amount of diisobutylene in the presence of about .03 to .30 mole of concentrated sulphuric acid at a temperature below 100° C., so as to effect a nuclear alkylation.

8. A process for preparing alpha, alpha, gamma, gamma tetramethylbutyl-resorcinol which consists in subjecting a mixture of reacting proportions of resorcinol and diisobutylene to the action of a concentrated sulphuric acid as a condensing agent.

9. A process for preparing alpha, alpha, gamma, gamma tetramethylbutyl-pyrocatechol which consists in subjecting a mixture of reacting proportions of pyrocatechol and diisobutylene to the action of concentrated sulphuric acid as a condensing agent.

10. A process for introducing an alpha, alpha, gamma, gamma-tetramethylbutyl group into the aromatic nucleus of a substance of the group consisting of resorcinol, pyrocatechol and hydroquinone, which consists in adding to a substantially equimolecular mixture of such respective dihydric phenol and diisobutylene 0.15–.30 mole of 96% sulfuric acid with stirring at a temperature below 100° C. and allowing the mixture to crystallize.

11. A process for introducting an alpha, alpha, gamma, gamma-tetramethylbutyl group into the aromatic nucleus of resorcinol which consists in treating an equimolecular mixture of resorcinol and diisobutylene with substantially 0.03 mole of 96% sulfuric acid at temperatures below 100° C. and allowing the reaction product to crystallize.

12. A process which consists in treating a dihydric phenol of the group consisting of resorcinol, pyrocatechol and hydroquinone with reacting proportions of diisobutylene in the presence of an acidic catalyst as a condensing agent.

JACK D. ROBINSON.
WILLIAM F. HESTER.